United States Patent [19]

Savins et al.

[11] Patent Number: 4,880,444

[45] Date of Patent: Nov. 14, 1989

[54] METHOD OF IMPROVING PERFORMANCE OF GAS-LIQUID SEPARATORS

[75] Inventors: J. George Savins, Dallas, Tex.; Scott G. Hugenberger, San Diego, Calif.; Peggy M. Wilson, Dallas, Tex.

[73] Assignee: Mobil Oil Corporation, New York, N.Y.

[21] Appl. No.: 815,098

[22] Filed: Dec. 31, 1985

[51] Int. Cl.$^4$ .................. B01D 17/02; B01D 19/04
[52] U.S. Cl. .................................. 55/36; 55/38; 55/45; 210/701; 210/733
[58] Field of Search ............... 55/36, 38, 45, 171–178; 166/308, 902; 210/701, 732, 733

[56] References Cited

U.S. PATENT DOCUMENTS

| | | | |
|---|---|---|---|
| 1,976,679 | 10/1934 | Fikentscher et al. | 210/733 X |
| 3,023,760 | 3/1962 | Dever et al. | 137/13 |
| 3,102,548 | 9/1963 | Smith et al. | 137/13 |
| 3,254,719 | 6/1966 | Root | 166/42 |
| 3,289,623 | 12/1966 | Gray et al. | 114/67 |
| 3,361,213 | 1/1968 | Savins | 166/902 X |
| 3,493,000 | 2/1970 | Canevari et al. | |
| 3,537,525 | 11/1970 | Sarem | 166/308 |
| 3,559,664 | 2/1971 | Seymour et al. | 137/13 |
| 3,562,226 | 2/1971 | Gayley et al. | 260/80.3 |
| 3,682,187 | 8/1972 | Seymour et al. | 137/13 |
| 3,687,148 | 8/1972 | Kruka et al. | 137/13 |
| 3,692,676 | 9/1972 | Culter et al. | 166/308 X |
| 3,757,864 | 9/1973 | Crawford et al. | 166/308 |
| 3,768,565 | 10/1973 | Persinski et al. | 166/308 |
| 3,887,487 | 6/1975 | Camp et al. | 55/45 X |
| 4,290,897 | 9/1981 | Swihart | 210/732 X |
| 4,330,450 | 5/1982 | Lipowski et al. | 210/733 X |
| 4,424,068 | 1/1984 | McMillan | 55/38 |
| 4,431,548 | 2/1984 | Lipowski et al. | 210/733 X |
| 4,569,682 | 2/1986 | Baker, Jr. et al. | 210/733 X |

FOREIGN PATENT DOCUMENTS

| | | | |
|---|---|---|---|
| 791202 | 7/1968 | Canada. | |
| 876020 | 7/1971 | Canada. | |
| 951050 | 7/1974 | Canada | 210/733 |
| 2056700 | 6/1971 | Fed. Rep. of Germany. | |

Primary Examiner—Robert Spitzer
Attorney, Agent, or Firm—Alexander J. McKillop; Charles J. Speciale; Stanislaus Aksman

[57] ABSTRACT

The performance of gas-liquid separators used to separate a liquid from a mixture containing at least one liquid and at least one gas, is enhanced by injecting into the mixture an additive, such as a suitable polymer, capable of imparting viscoelastic properties to the liquid. Suitable separators are those wherein crude oil is separated from a mixture obtained from an underground oil reservoir, the mixture typically containing water, hydrocarbon oil and gas.

18 Claims, 6 Drawing Sheets

METHOD OF IMPROVING PERFORMANCE OF GAS-LIQUID SEPARATORS

BACKGROUND OF THE INVENTION

1. Field of the Invention

This invention is directed to a method for improving performance of gas-liquid separators. More particularly, the invention is directed to a method of improving the operation of gas-liquid separators which separate hydrocarbonaceous liquids, e.g., crude oil, from gas, such as gas contained in the stream of crude oil produced from an underground reservoir.

2. Description of Related Art

In many industrial applications, it is necessary to separate a liquid constituent of a mixture from the gaseous constituent thereof. For example, crude oil, which is produced from underground reservoirs as a mixture of oil, water and hydrocarbon gases (natural gases), must be separated from the water and gases before it is subjected to downstream processing and upgrading. The natural gas normally consists of a mixture of strength chain or paraffin hydrocarbon gases plus lesser amounts of cyclic and aromatic hydrocarbons. The gas stream may also consist of small quantities of $CO_2$, $H_2S$, mercaptans and $H_2$.

Different devices are known in the art which separate such entrained gases from liquid hydrocarbons, as illustrated in "Fundamentals of Oil and Gas Separation", by C. R. Sivalls in *Proceedings of the Gas Conditioning Conference*, University of Oklahoma, Mar. 7-9, 1977, and in *Fundamentals of Natural Gas Conditioning* by R. N. Curry, PennWell Publishing Company, 1983, and in the patent literature. For example, McMillan, U.S. Pat. No. 4,424,068, discloses a separator for separating a mixture of oil, gas and water received from a hydrocarbon-producing well. The separator comprises a vessel containing a dynamic separator device followed by separation chambers. The dynamic separator device progressively increases the droplet size of the oil and water of the mixture by flowing it in a spiral. Subsequently, the mixture is forced to flow linearly into the first of a series of the separation chambers, wherein the mixture is impacted against an impact member to partially separate the gas from the resultant oil and water mixture. The partially separated gas is processed separately from the resulting mixture of water and oil. An unspecified treatment chemical may be admixed with the mixture to enhance the separation of the constituent components of the mixture from each other.

Other three-phase oil-gas-water separators are also known in the art. For example, typical horizontal and vertical three-phase oil-gas-water separators are disclosed by H.V. Smith in *Petroleum Production Handbook*, Volume I, Chapter 11, McGraw-Hill Book Company, Inc., New York (1962), edited by T. C. Frick and R. W. Taylor, the entire contents of Chapter 11 being incorporated herein by reference.

Rivers, Jr., et al., U.S. Pat. No. 4,132,535, disclose the use of a copolymer of an alkene-substituted pyridinium group and an alkene-substituted benzene group, such as a copolymer of styrene and 2-vinyl pyridine, in gas streams to control the formation of oil and water emulsions and hydrates.

SUMMARY OF THE INVENTION

The separation of a liquid from a mixture comprised of at least one gas and at least one liquid in a gas-liquid separation apparatus means in enhanced by injecting into the mixture at least one additive capable of imparting viscoelastic properties to the liquid in the mixture. If the mixture comprises a hydrocarbon and an aqueous liquid, two different additives are injected into the mixture, one of such additives being soluble in the hydrocarbon liquid and the other in the aqueous liquid.

If the mixture comprises only one hydrocarbon liquid, the additive injected into the mixture must be soluble in the hydrocarbon liquid. If the mixture comprises several hydrocarbon liquids, the additive injected into the mixture must be soluble in all of the hydrocarbon liquids.

DETAILED DESCRIPTION OF THE INVENTION

Figure 1:
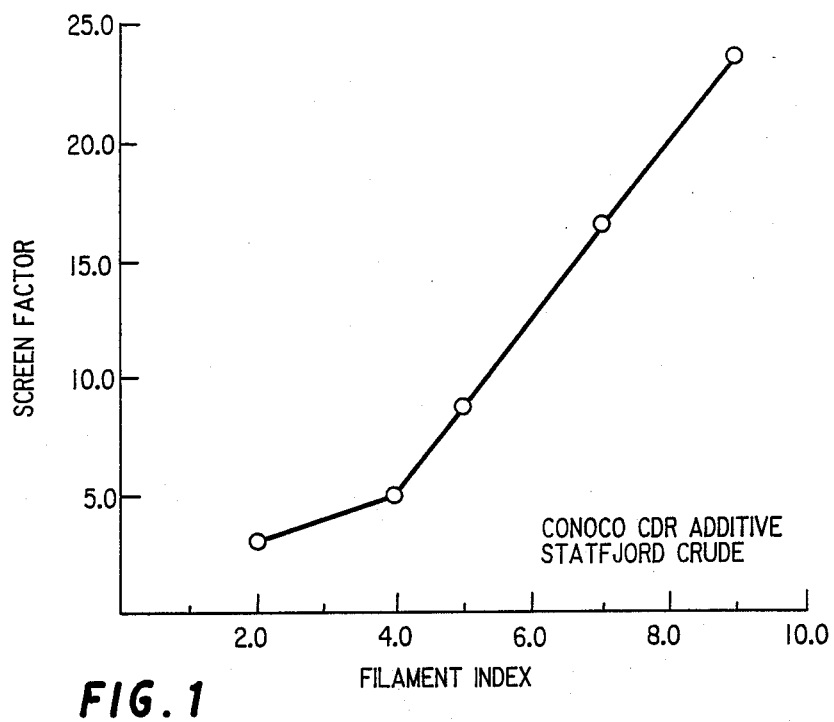
FIG. 1 is a graph of the relationship between the Screen Factor and Filament Index for the data of Example I.
Figure 2:
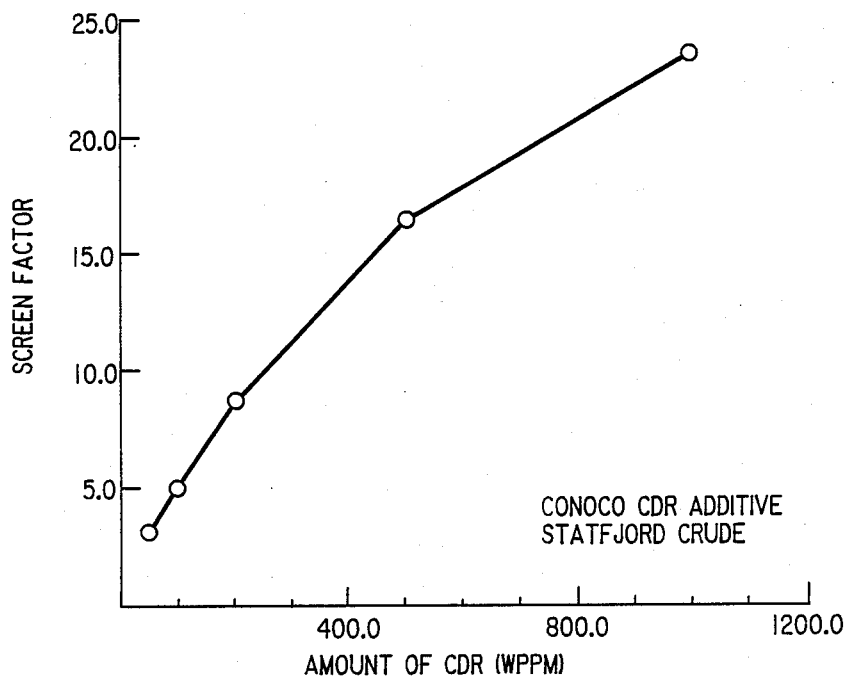
FIG. 2 is a graph of the relationship between the Screen Factor and Filament Index for the amount of the Conoco CDR-102 additive in a Statfjord crude for the data of Example I.
Figure 3:
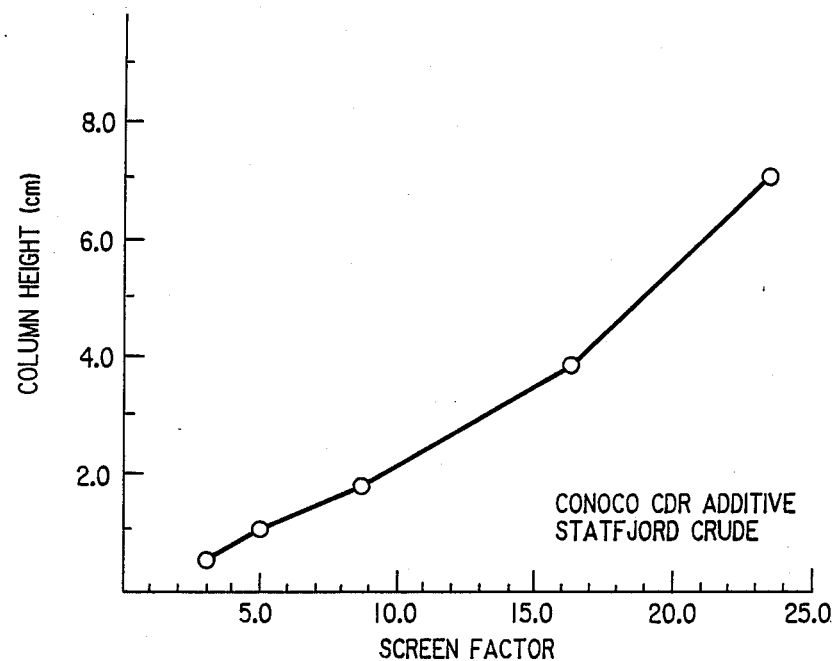
FIG. 3 is a graph of the relationship between the Column Height and the Screen Factor for the Statfjord crude containing the Conoco CDR-102 additive (Example I).

The liquid to be separated from the mixture of liquid and gases in accordance with the present invention is any liquid which is an aqueous phase or a non-aqueous phase, an example of the former being a formation brine, and an example of the latter being a crude oil.

More than one gas-liquid separator vessel in series may be used in the process of this invention. In such a case, it may be necessary to inject the additive between the consecutive vessels, depending upon the nature of the liquid, the mixture thereof with the gas and other process conditions, as will be apparent to those skilled in the art. Although the method of the present invention can be practiced with any known separator means, it is particularly suitable for enhancing the performance of crude oil-gas separators, such as that described by H. V. Smith on pages 11-17 of *Petroleum Production Handbook*, cited above.

Thus, in the preferred embodiment, the method of the present invention is directed to gas-liquid separators used to separate crude oil from a mixture thereof with water and gas. Accordingly, the invention will be described herein in conjunction with the use thereof in a crude oil separator means. However, it will be obvious to those skilled in the art that the process is not limited to that particular application and that it can be used in any gas-liquid separator means.

As is known to those skilled in the art, crude oil recovered from underground formations is usually recovered in the form of mixtures containing the crude oil, gas, comprised mostly of hydrocarbons, and water. According to the method of the present invention, the operation of such gas-liquid separators is modified by injecting at least one additive into the stream of the mixture of the crude oil, water and gas before the introduction thereof into the gas-oil separator or simultaneously therewith. The additive is injected to impart viscoelastic properties to the liquid. Without wishing to be bound by any theory of operability, it is believed that the liquids having such viscoelastic properties generate substantially reduced amounts of mist as compared to the same liquids containing no additives. The liquids without the additives, it is believed, exhibit Newtonian liquid characteristics or purely viscous, i.e., non-viscoelastic, flow properties. The mist is normally generated by the impingement of the entering stream of the mixture on the internal portions of the gas-liquid separators, collision of droplets, liquid blow-off from surfaces, pressure changes and bubble collapse within the gas-liquid separators. The misting is undesirable because it can adversely affect separator efficiency. The production-limiting entrainment of oil and water in the form of fine liquid particulates (mist) in the gas stream in the separator is a particularly costly problem. In conventional prior art separator technology, a mist extractor or eliminator, such as woven wire mesh or ceramic packing, was located near the gas outlet to coalesce the small liquid particles that did not settle out. Such typical particles have the same size range of about 40 to about 500 microns.

In the practice of the invention, the mixture recovered from the underground oil-containing formation is conducted to a conventional liquid-gas separator. Prior to the introduction of the mixture into the separator or simultaneously therewith, there is injected into the mixture a t least one additive capable of imparting viscoelastic properties to the hydrocarbon liquid. If water is present in such a liquid, a water-soluble additive is also added simultaneously with or subsequently to the addition of the first additive into the mixture so long as the water-soluble additive is introduced before or simultaneously with the introduction of the mixture into the separator. The rate of the addition of the two additives depends on the amount of the water and the crude oil in the mixture. The addition of the two additives into the mixture reduces the amount of misting produced inside of the gas-liquid separator means. The amount of the additive required to impart viscoelastic properties to the liquid will depend, as will be apparent to those skilled in the art, on the nature of the liquid and the relative amount thereof in the mixture to be treated. In this connection, the term "viscoelastic properties" is used herein to designate a combination of unusual rheological phenomena superimposed on what superficially appears to be simple Newtonian fluid according to a classical viscosity determination. The characteristics of viscoelastic liquids are discussed in published references, such as: *Rheometry*, K. Walters, Champman and Hall/John Wiley Pub. 1975, *Dynamics of Polymeric Liquids*, R. B. Bird, R. C. Armstrong, and O. Hassager, J. Wiley and Sons Inc., Pub. 1977, "Flow of Non-Newtonian Fluids", A. B. Metzner, in *Handbook of Fluid Dynamics*, McGraw-Hill Co., Inc., 1961, and *Viscoelastic Properties of Polymers*, J. D. Ferry, Wiley Publishing Co., 1961, the contents of all of which are incorporated herein by reference.

One of the methods of detecting the presence of viscoelastic behavior in a liquid, especially dilute (relatively liquid), involves the use of the Dow Screen Viscometer. The Dow Screen Viscometer consists of a capillary-type viscometer fitted with a series of fine mesh screens, as described in detail by MacWilliams, et al., "WATER SOLUBLE POLYMERS IN PETROLEUM RECOVERY", *Water Soluble Polymers*, N. M. Bikales, editor, Plenum Press, New York, 1973, the entire contents of which are incorporated herein by reference. Briefly, in the Dow Screen Viscometer, the alternating converging/diverging flow field through the mesh of each screen produces a "non-viscometric" flow which is response to the presence of viscoelasticity in dilute solutions. Results of the screen viscometer tests are reported as "Screen Factor", which is the ratio of the flow time of the liquid containing the additive to the flow time of the untreated liquid. Thus, a sufficient amount of the hydrocarbon- and/or water-soluble additive or additives is injected into the mixture to cause the mixture to have a Screen Factor of about 3 to about 65, preferably about 5 to about 50 and, most preferably, about 5 to about 30. Dilute viscoelastic solutions (i.e., mixtures containing the additive or additives) of the type considered here will be characterized by a Screen Factor larger than the relative viscosity ratio, defined as the viscosity of liquid plus additive divided by the viscosity of the untreated liquid. Such viscoelastic solutions will have the values of Screen Factor which are at least 1.4 times the relative viscosity ratio. A solution containing 100 parts per million by weight (wppm) of an additive characterized by high molecular weight and high flexibility can, as a consequence of its viscoelastic properties, be characterized by a Screen Factor and order of magnitude or more larger than the viscosity ratio. Generally speaking, for a given concentration, the higher the molecular weight the higher the Screen Factor. In addition to molecular weight and concentration, the Screen Factor is also affected by molecular structure parameters and solubility effects.

Another device which can be used to determine the viscoelastic properties of the liquid and, therefore is useful in evaluating the efficacy of the additives, is the "Ductless Siphon", described by Peng et al., in "PRELIMINARY INVESTIGATION OF ELONGATIONAL FLOW OF DILUTE POLYMER SOLUTIONS", *JOURNAL OF APPLIED PHYSICS*, Vol. 47, p. 4255 (1976), the entire contents of which are incorporated herein by reference. This apparatus, in use, approximates an elongational flow, and thus can be used to detect the filament-forming effect dominated by liquid elasticity and elongational viscosity. The results of testing in the Ductless Siphon are reported in terms of "Column Height" which is the height of rise of an unsupported column from a quiescent pool into the opening of a capillary. If the Ductless Siphon is used to test the properties of the mixture containing hydrocarbon- and/or water-soluble additive or additives, the Column Height of such a mixture must be about 0.5 to about 35, preferably about 1 to about 25, and most preferably about 1 to about 15 centimeters (cm).

If more than one additive is injected into the mixture to impart viscoelastic properties to the water contained in the mixture and to the crude oil, the amount of each additive injected into the mixture is controlled separately to impart to both, the water and the crude oil, the viscoelastic properties as discussed above.

Various hydrocarbon-soluble additives that impart drag reducing and viscoelastic properties which can be used in accordance with the present invention have a molecular weight of about $0.4 \times 10^6$ to about $50 \times 10^6$, preferably about $1 \times 10^6$ to about $30 \times 10^6$ and most preferably about $1 \times 10^6$ to about $15 \times 10^6$. The additives include such materials as polydimethylsiloxane resins having a structure comprising

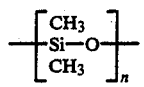

characterized by viscosity average molecular weight of about $0.8 \times 10^6$ to about $30 \times 10^6$ described by Canevari et al, U.S. Pat. No. 3,493,000, made by processes referenced by Lichtenwalner and Sprung, "Silicones", in N. M. Bikales, Executive Editor, *Encyclopedia of Polymer Science and Technology,* Interscience Publishers, 1967, Chapter 12; copolymers of ethylene and propylene, disclosed by Seymour et al, U.S. Pat. No. 3,559,664, and the Netherlands Published Application No. 6,813,862, the entire contents of both being incorporated herein by reference; aluminum salt of an alkyl phosphate ester, as disclosed by Crawford et al, U.S. Pat. No. 3,757,864, also discussed by Sylvester et al in "The Concentration and Friction Velocity Effects on Drag Reduction by Dowell-APE in Kerosene" *Ind. Eng. Chem. Prod. Res. Dev.,* Vol. 18, No. 1, 1979, pages 47-49, the contents of both being incorporated herein by reference; homopolymers or copolymers of alpha-olefin monomers having from 6 to 20 carbon atoms having a molecular weight of from 1 to 40 million, disclosed by Culter et al, U.S. Pat. No. 3,692,676, the entire contents of which are incorporated herein by reference; homopolymers and copolymers of derivatives of acrylic acid, methacrylic acid, or styrene, disclosed in German Published Application No. 2,056,700, the entire contents of which are incorporated herein by reference; and two block copolymers consisting of a block A, substantially soluble in the hydrocarbon phase having an average molecular weight of between 50,000 and 20 million, and a block B, substantially less soluble in the hydrocarbon phase, having average molecular weight between about 500 and 5 million, as disclosed by Kruka et al, U.S. Pat. No. 3,687,148 and Seymour et al, U.S. Pat. No. 3,682,187, the entire contents of both being incorporated herein by reference.

Various water-soluble additives that impart viscoelastic and drag reducing properties which may be employed in carrying out the present inventions have a molecular weight of about $0.4 \times 10^6$ to about $50 \times 10^6$, preferably about $1 \times 10^6$ to about $30 \times 10^6$, and most preferably about $1 \times 10^6$ to about $15 \times 10^6$. The water-soluble additives include copolymers of acrylamide and dimethyl diallyl ammonium chloride or diallyl ammonium compounds, with and without cross-linking by N-N methylene bisacrylamide, disclosed in U.S. Pat. No. 3,562,226; copolymers of acrylamide and N-N methylenebisacrylamide, disclosed in Canadian Pat. No. 791,202; acrylic acid-acrylamide diacetone acrylamide terpolymer, disclosed in U.S. Pat. No. 3,537,525; copolymers of 2-acrylamido-2-methylpropane sulfonic or its water-soluble salt and acrylamide, having molecular weight of at least 1 million, disclosed in U.S. Pat. No. 3,768,565; polyethylene oxide polymers, disclosed in U.S. Pat. No. 3,289,623; monoalkenyl aromatic sulfonate polymers, disclosed in U.S. Pat. No. 3,023,760; polyacrylamide polymers disclosed in U.S. Pat. Nos. 3,102,548 (Smith et al) and 3,254,719; and, acrylic acid-acrylamide-diacetone acrylamide terpolymer disclosed in Canadian Pat. No. 876,020 (Sarem). The entire contents of all of the above-identified patents disclosing water-soluble polymers are incorporated herein by reference.

In general, additives which can be used in this invention are such additives which: are readily dispersible in the liquid phase, i.e., the crude oil or water; produce an additive-liquid combination characterized as having "viscoelastic" properties, as evidenced by the test results obtained with the Screen Viscometer, Ductless Siphon, or similar devices; have substantially no adverse effect on downstream processing of the liquids or the gases; and are not characterized by a narrow distribution of molecular weight.

As will be apparent to those skilled in the art, the exact composition of an additive package for mist suppression will depend upon the characteristics of the crude oil, the chemistry of the water produced with the oil, separator operating conditions, characteristics of the additives and logistic requirements. The mist suppression additives package may also include materials which support and/or enhance the viscoelastic/suppression activity by providing such vital functions as sacrificial adsorption, defoaming action, oxygen scavenging and maintenance of proper water chemistry. For example, in the event a waxy crude is recovered from the underground formation, it may be necessary to include an agent, such as a pour point depressant, which is preferentially interacted with the wax crystals to minimize undesirable depletion of the mist suppressor. If the crude recovered from the underground formation is a foamy crude, it may be necessary to add a defoamer to the package of additives to minimize the contribution of fine liquid particulates (mist) from this source.

If the mixture of the liquid and the gases to be treated contains water, it may be necessary to adjust water chemistry to minimize precipitation of the additive. For example, it is known that certain polyacrylamides tend to precipitate in the presence of divalent ions. Therefore, if such a polyacrylamide were to be used, the divalent ions would have to be initially removed or complexed and, possibly, pH adjusted to minimize oxidative degradation.

It is also important in practising the present invention to minimize premature shear degradation of the additive which may result from mixing the additive with the liquid, e.g., in the injection pump, or at points of sudden expansion or contraction within the injection piping system. Shear degradation of such additives can be minimized in a manner known to those skilled in the art. For example, the possible shear degradation of water-soluble additives can be minimized by injecting the form of a heated slurry consisting of undispersed additives suspended in a non-interacting carrier liquid, as taught in U.S. Pat. No. 3,435,796. According to the teachings of that patent, micron-sized polymer particles are rendered inert while dispersed in a hot carrier phase and subsequently activated to produce essentially unsheared polymer when introduced to a cool aqueous phase just prior to the injection thereof into the separator. Another means of minimizing the shear degradation is disclosed in U.S. Pat. No. 3,601,079. Alternatively, an emulsion of the polymer may be employed wherein a high concentration of unswollen (inert) polymer particles is suspended in an emulsion which is subsequently broken up just prior to the injection into the mixture of the gas and the liquid.

As discussed above to some extent, the water-soluble and the hydrocarbon-soluble additives of the present invention are injected into the mixture separately, and they are amenable to process control operations. Therefore, remote control of separator performance is possible by a suitable system injecting the additive mix upon the receipt of a signal from a mist-detecting transducer or other suitable devices, e.g., a nuclear densitometer, within the liquid-gas separator. As will be apparent to those skilled in the art, any other methods of injecting the additives of the present invention are also contemplated herein.

The following Examples further illustrate the essential features of the invention. However, it will be apparent to those skilled in the art that the specific reactants and reaction conditions used in the Examples do not limit the scope of the invention.

Before illustrating this invention with specific examples, it is desirable to describe how the atomization experiments were performed. Baseline tests were performed on additive-free liquids as follows: liquid was converted to mist in an apparatus consisting of an atomizer fitted with a gas (nitrogen) supply and controls to provide constant liquid feed rate but different gas/liquid ratios. This flow system was enclosed in a transparent chamber where the spray was photographed using a high intensity electronic flash to "freeze" the pattern.

For the baseline conditions selected, untreated liquid was ejected from the atomizer in the form of a mist comprised of liquid droplets. Untreated liquid did not produce a measurable Column Height in the ductless siphon test. The efflux time through the screen viscometer of untreated liquid was recorded for interpretation of results with treated liquid.

The atomization tests were then repeated with liquids containing additives known to impart viscoelastic properties and an additive known for its anti-foaming qualities. As will be seen, effective additives substantially reduced mist formation. Fine liquid droplets were replaced by mixtures of liquid filaments. Analysis of the photographic records showed that as additive concentration increased, the morphology of the liquid ejected from the atomizer changed in the following order: liquid drops—multiple short filaments—multiple long filaments—monofilaments. These results were interpreted in terms of a "Filament Index" in which an injection of droplets was given a rank of zero and an injection of monofilaments was given a rank of 10. The onset of mist suppression is taken as a Filament Index of the order of 1.

Since these additives are subject to shear degradation during the Screen Factor and ductless siphon tests, Screen Factor, Column Height and viscosity were determined on aliquots of treated liquids prior to the atomization experiments.

All of the materials employed in the examples are known for their "drag reducing" qualities. Drag reduction in hydrocarbon liquids with Conoco CDR is discussed by Burger, E. D., et al, in "Studies of Drag Reduction Conducted Over a Broad Range of Pipeline Conditions When Flowing Prudhoe Bay Crude Oil", *Trans. Society of Rheology,* Vol. 24, p. 603, 1980. The drag reducing characteristics of Dowell polyacrylamides and Union Carbide polyethylene oxides are cited by P. S. Virk, "Drag Reduction Fundamentals", *AIChE Journal,* Vol. 21, p. 625, 1975. Additive-liquid characteristics and conditions required for optimum drag reducing characteristics, e.g., high molecular weight, low molecular rigidity, high ratio of molecular weight to critical chain entanglement molecular weight, and good solvent qualities (as opposed to theta solvent qualities) are discussed by G. Liaw, J. L. Zakin, and G. K. Patterson, "Effects of Molecular Characteristics of Polymers on Drag Reduction", *AIChE Journal,* Vol. 17, p. 391, 1971. For an example of an application of drag reduction, see J. G. Savins, "Method of Decreasing Friction Loss in Turbulent Flow", U.S. Pat. No. 3,361,213 (1968).

Examples I and Examples II–III illustrate the invention with materials producing viscoelastic effects and suppressing mist production in hydrocarbon and aqueous media, respectively. Example IV illustrates the results obtained with a non-viscoelastic anti-foaming type additive.

EXAMPLE I

The atomization tests described above were performed with a bath of Statfjord crude oil treated with different concentrations of an additive referred to here as "Conoco CDR-102" obtained from Conoco, Inc., Houston, Tex. It is thought that the additive is a high molecular weight polyolefin, such as that taught in U.S. Pat. No. 3,692,676, issued Sept. 10, 1972, which discloses the preparation and use of small quantities of very high molecular weight polyolefins to reduce friction losses of hydrocarbon liquids flowing through conduits.

The results are summarized in FIGS. 1–3. The baseline atomization condition where only droplets are produced is indicated in FIG. 1 by Filament Index and Screen Factor values of 0 and 1, respectively.

The correlation between Filament Index or mist suppression and Screen Factor for this additive-liquid pair is illustrated in FIG. 1. Note that a significant change in the misting character of this hydrocarbon liquid results on addition of Conoco CDR. The onset of mist suppression for this additive-liquid pair corresponds to a Screen Factor of about 2.5. Multiple short filaments appear at a Screen Factor of about 3.0. At a Filament Index of about 4, corresponding to a Screen Factor of about 5, droplet production is significantly suppressed with spray morphology characterized by the ejection of multiple long filaments.

The correlation between Screen Factor and concentration is illustrated in FIG. 2. The onset of mist suppression occurs at about 50 wppm additive, with suppression occurring over a broad range of additive concentration. Comparing FIGS. 1 and 2, significant mist suppression results between 100 wppm and 200 wppm. At 200 wppm, corresponding to a screen factor of about 9, multiple long filaments are produced.

Column Height and Screen Factor are correlated in FIG. 3. This result is significant, indicating the mist suppression effect is closely related to elongational viscosity properties that appear when the liquid is converted to a viscoelastic liquid. The correlation also demonstrates that either the ductless siphon or the screen viscometer can be used to screen additives for application in the practice of this invention. However, the screen viscometer is a preferred experimental technique because of the simplicity of design and operation.

EXAMPLE II

Similar atomization experiments were performed in aqueous media (deionized water) containing different concentrations of partially hydrolyzed poly(acrylamides) designated by Dowell as "J430", "J431", and "J432", available from Dowell, Inc., Tulsa, Okla.

Figure 4:
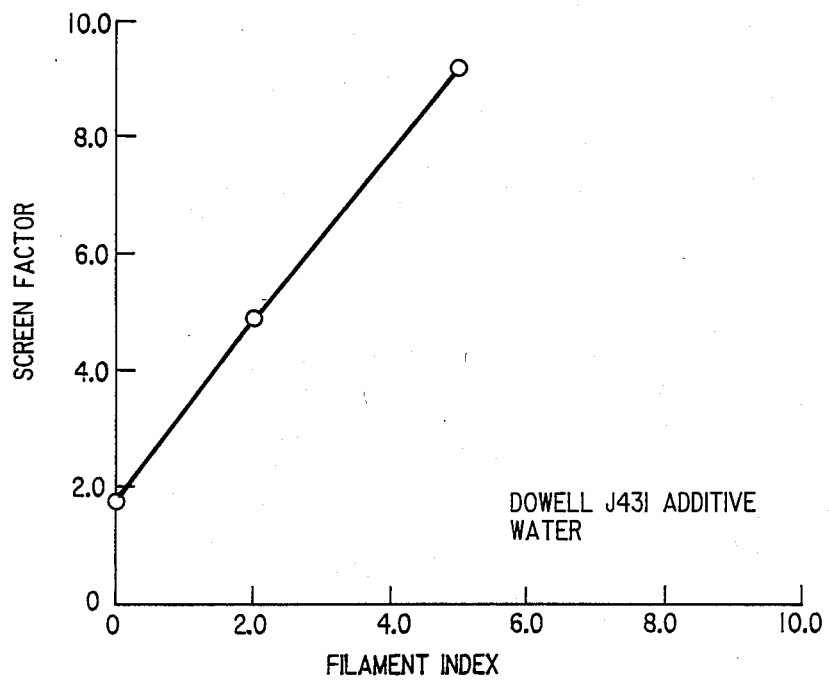
FIG. 4 is a graph of the relationship between the Screen Factor and the Filament Index for the water solution containing the Dowell J431 additive (Example II).
Figure 5:
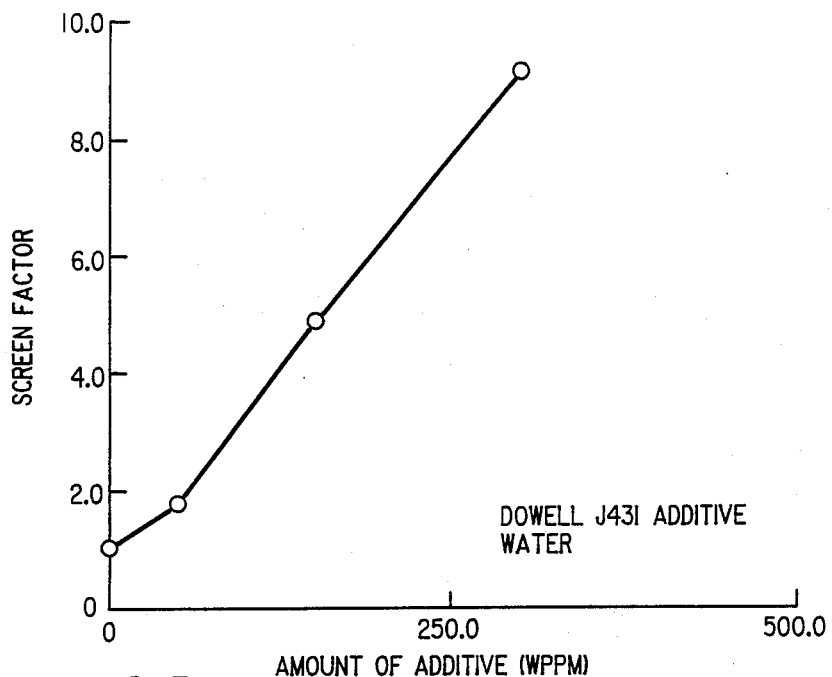
FIG. 5 is a graph of the relationship between the Screen Factor and the amount of the J431 additive of the water solution (Example II).
Figure 6:
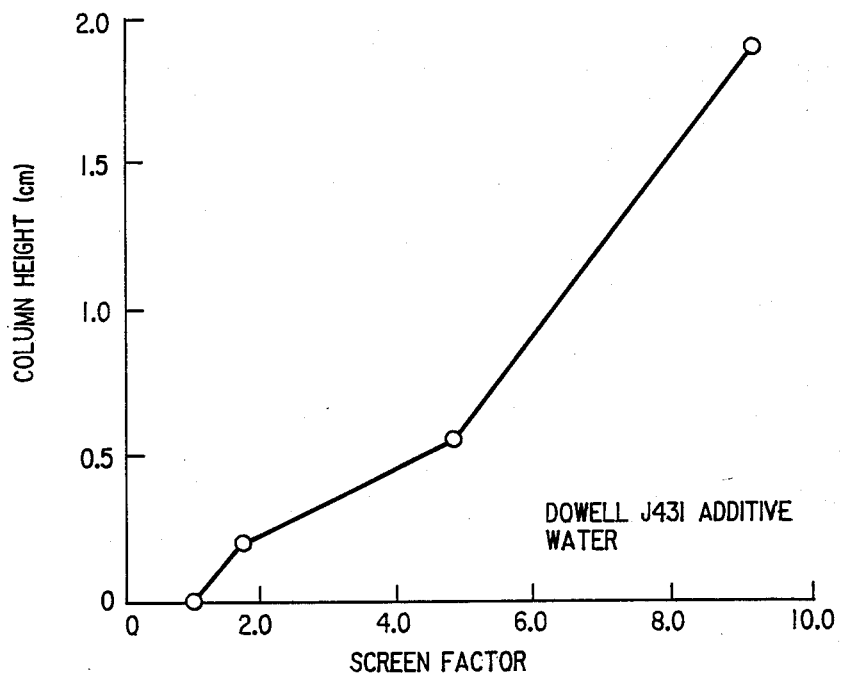
FIG. 6 is a graph of the relationship between the Screen Factor and the Column Height of the water solution containing the Dowell J431 additive (Example II).

Results obtained with the J431 additive are illustrated in FIGS. 4–6. In general, the trends and correlations are qualitatively similar to those obtained with the hydrocarbon soluble additives of Example 1. However, at a given concentration, the Conoco CDR-102 additive is more effective at suppressing misting in Statfjord crude than the J431 additive is in suppressing misting in water. Performance parameters for the J430 and J432 additives are illustrated in Table I below.

TABLE I

| Additive | Conc. (wppm) | Screen Factor | Column Ht | Filament Index | Relative Viscosity Ratio |
|---|---|---|---|---|---|
| J430 | 50 | 1.9 | — | 0 | 1.2 |
| J432 | 50 | 1.7 | — | 0 | 1.3 |
| J430 | 150 | 3.5 | 0.44 | 2 | 1.4 |
| J430 | 300 | 6.9 | 1.06 | 7 | 3.8 |
| J432 | 300 | 13.5 | 2.95 | 7 | 5.6 |

These results and those given in FIGS. 4–6 show for those additive-pairs the onset concentration is above 50 wppm, and active mist suppressing systems are characterized by a Screen Factor considerably larger than the corresponding relative viscosity ratio.

EXAMPLE III

Atomization experiments were performed with aqueous solutions containing different concentrations of poly(ethylene) oxides designated by Union Carbide Company, Danbury, Connecticut, as "N-12K", "N-60K", "WSR 301", and "Coagulant". These solutions contained 10 percent (wt.) isopropyl alcohol to inhibit oxidative degradation of the additives. Typical results are summarized in Table II below:

TABLE II

| Additive | Conc. (wppm) | Screen Factor | Column Height | Filament Index |
|---|---|---|---|---|
| N-12K | 50 | 1.86 | 0.25 | 0 |
| N-60K | 50 | 3.77 | 0.20 | 2 |
| Coagulant | 75 | 51.5 | 7.8 | 9 |
| N-60K | 150 | 6.0 | 0.45 | 5 |
| Coagulant | 200 | 62.8 | 14.3 | 9 |
| N-12K | 1200 | 10.2 | 1.98 | 9 |
| WSR301 | 50 | 12.1 | 0.69 | 2 |
| Coagulant | 50 | 36.4 | 4.2 | 7 |
| Coagulant | 100 | — | — | 9 |
| N-12K | 150 | 3.1 | 0.2 | 2 |
| WSR301 | 150 | 21.1 | 2.52 | 7 |
| Coagulant | 150 | 55.1 | 11.9 | 9 |
| N-12K | 300 | 4.8 | 0.44 | 5 |
| N-60K | 300 | 7.9 | 0.91 | 5 |
| WSR301 | 300 | 29.4 | 5.2 | 9 |
| N-60K | 1200 | 18.5 | — | 9 |

These results, qualitatively similar to those shown in the preceding examples, show that useful mist suppression effects can be obtained with poly(ethylene) oxide derivatives.

Examples I–III illustrate the following:

(1) the onset concentration depends on the additive-liquid pair of interest, with active materials suppressing droplet formation at concentrations of the order of 50 wppm.

(2) evidence of Screen Factor or Column Height activity is a valid screening criterion for predicting mist suppression activity, (3) the magnitude of the Screen Factor and Column Height at the onset of mist suppression will depend on the additive-liquid pair, (4) preferred active mist suppressing systems are characterized by a Screen Factor at least about twice the relative viscosity ratio, (5) the mist production is inhibited if a mixture or solution is characterized by a Screen Factor of at least about 5, (6) significant mist suppression usually occurs between 50 wppm and 200 wppm, (7) effective mist suppression, without excessive relative viscosity ratio, can result in a mixture or solution characterized by a Screen Factor of the order of 25, (8) an additive-liquid pair characterized by a Screen Factor of the order of 50 is likely to totally suppress mist formation, (9) mist suppression as disclosed in this invention is demonstrated in hydrocarbon liquids using high molecular weight polyolefins, and in aqueous media using molecular weight poly(ethylene) oxides and partially hydrolyzed poly(acrylamides),

(10) since the materials demonstrating mist suppression also exhibit drag reducing characteristics, if follows that evidence of drag reducing behavior in the process fluid of interest may be a valid criterion for predicting mist suppression activity,

(11) characteristics and conditions considered desirable for optimum drag reducing activity are also preferred for effective mist suppression in the practice of this invention, e.g., high molecular weight, low molecular rigidity, high ratio of molecular weight to critical chain entanglement molecular weight, and good solvent qualities (as opposed to theta solvent qualities).

EXAMPLE IV

Atomization experiments were performed with batches of Statfjord (S) and High Island (HI) crudes treated with an additive referred to herein as "Dow Corning 200", a known anti-foaming agent. The purpose of these tests was to determine whether under the baseline atomization conditions used herein anti-foaming activity would alter the morphology of liquid ejected from the atomizer in a manner similar to that produced with viscoelastic additives. Table III below summarizes typical results of these tests with the Dow Corning product:

TABLE III

| Crude | Conc. (wppm) | Screen Factor | Column Height | Filament Index |
|---|---|---|---|---|
| S | 200 | 1.0 | 0.0 | 0.0 |
| HI | 200 | 1.0 | 0.0 | 0.0 |

Only data at the high concentration level of 200 wppm are presented because the screen factor for the Dow Corning product was found to be unity (or close to it) and independent of concentration over the range investigated (up to 200 wppm). Treatment levels extended well beyond the concentration required for good anti-foaming effectiveness. However, no mist suppression occurred, as evidenced by Filament Index values of zero, because the defoamer did not impart viscoelastic properties to these hydrocarbon liquids, as evidenced by Screen Factor and Column Heights of unity and zero, respectively. Thus anti-foaming quality is not a sufficient condition for mist suppression as illustrated in this Example.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of enhancing the separation, in a gas-liquid separator means, of a liquid from a mixture comprising a gas and at least one liquid comprising injecting into the mixture at least one additive imparting viscoelastic properties to the liquid, the amount of the additive being effective to cause the mixture to have a Screen Factor of about 3.0 to about 65.0.

2. A method of claim 1 wherein the amount of the additive is effective to cause the mixture to have a Screen Factor of about 5.0 to about 50.

3. A method of claim 1 wherein the amount of the additive is effective to cause the mixture to have a Screen Factor of above 5.0 to about 30.

4. A method of claim 3 wherein the Screen Factor of the mixture is at least 1.4 times the Relative Viscosity Ratio.

5. A method of claim 4 wherein the amount of the additive is effective to cause the mixture to have the Column Height of about 0.5 to about 35.

6. A method of claim 5 wherein the amount of the additive is effective to cause the mixture to have the Column Height of about 1.0 to about 25.

7. A method of claim 6 wherein the amount of the additive is effective to cause the mixture to have the Column Height of about 1.0 to about 15.

8. A method of claim 7 wherein the mixture comprises at least one hydrocarbon atom.

9. A method of claim 8 wherein the additive is a polymer having a molecular weight of about 400,000 to about $50 \times 10^6$.

10. A method of claim 9 wherein the additive is a polymer having a molecular weight of about $1 \times 10^6$ to about $30 \times 10^6$.

11. A method of claim 10 wherein the additive is a polymer having a molecular weight of about $1 \times 10^6$ to about $15 \times 10^6$.

12. A method of claim 11 wherein the additive is selected from the group consisting of polydimethylsiloxane of U.S. Pat. No. 3,493,000, copolymers of ethylene and propylene of U.S. Pat. No. 3,559,664, aluminum salt of a straight or branched chain alkyl phosphate ester of U.S. Pat. No. 3,757,864, homopolymers or copolymers of $C_6$–$C_{20}$ alpha-olefins of U.S. Pat. No. 3,692,676, homopolymers and copolymers of derivatives of acrylic acid, methacrylic acid, or styrene, and two block copolymers consisting of a block A, substantially soluble in the hydrocarbon liquid having an average molecular weight of between 50,000 and 20 million, and a block B, substantially less soluble in the hydrocarbon liquid, having average molecular weight of between about 500 and 5 million, of U.S. Pat. Nos. 3,687,148 and 3,682,187.

13. A method of claim 12 wherein the mixture comprises at least one aqueous liquid.

14. A method of claim 13 wherein a second additive is injected into the mixture, separately and independently from the first additive, the second additive being soluble in the aqueous liquid.

15. A method of claim 14 wherein the second additive is a polymer having molecular weight of about $0.4 \times 10^6$ to about $50 \times 10^6$.

16. A method of claim 15 wherein the second additive is a polymer having molecular weight of about $1 \times 10^6$ to about $30 \times 10^6$.

17. A method of claim 16 wherein the second additive is a polymer having molecular weight of about $1 \times 10^6$ to about $15 \times 10^6$.

18. A method of claim 17 wherein the second additive is selected from the group consisting of copolymers of acrylamide and dimethyl diallyl ammonium chloride or diallyl ammonium compounds with or without cross-linking by N,N'-methylene bisacrylamide of U.S. Pat. No. 3,562,226, copolymers of acrylamide and N-N methylenebisacrylamide, acrylic acid-acrylamide-diacetone acrylamide terpolymer of U.S. Pat. No. 3,537,525, copolymers of 2-acrylamido-2-methylpropane sulfonic acid or its water-soluble salt and acrylamide of U.S. Pat. No. 3,768,565, polyethylene oxide polymers of U.S. Pat. No. 3,289,623, monoalkenylaromatic sulfonate polymers of U.S. Pat. No. 3,023,760, having the formula:

wherein
Ar is a divalent aromatic radical selected from the group consisting of hydrocarbon radicals and nuclear chlorinated hydrocarbon radicals having its valence bonds on nuclear carbon atoms;
R is hydrogen or methyl; and
M is a cation,
polyacrylamide polymers of U.S. Pat. Nos. 3,102,548 and 3,254,719, and acrylic acid-acrylamide-diacetone acrylamide terpolymer.

* * * * *